United States Patent
Hua et al.

(10) Patent No.: US 7,242,563 B2
(45) Date of Patent: Jul. 10, 2007

(54) REVERSE PHASE CONTROL POWER SWITCHING CIRCUIT WITH OVERLOAD PROTECTION

(75) Inventors: Jenkin P. Hua, Plainsboro, NJ (US); Alfred J. Lombardi, LaGrangeville, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 81 days.

(21) Appl. No.: 10/128,880

(22) Filed: Apr. 22, 2002

(65) Prior Publication Data

US 2003/0197995 A1    Oct. 23, 2003

(51) Int. Cl.
H02H 3/26 (2006.01)
H02H 3/18 (2006.01)
H02H 9/08 (2006.01)

(52) U.S. Cl. .......................... 361/100; 361/77; 361/85; 361/93.9

(58) Field of Classification Search .................. 361/18, 361/91.1, 91.3, 93.1, 93.2, 93.7, 93.8, 93.9, 361/20, 21, 23–25, 30–33, 111, 77, 85, 100; 323/235, 237
See application file for complete search history.

(56) References Cited

U.S. PATENT DOCUMENTS

| 4,429,339 | A | * | 1/1984 | Jaeschke et al. ........... 361/93.7 |
| 4,528,494 | A | * | 7/1985 | Bloomer ...................... 323/237 |
| 5,004,969 | A | * | 4/1991 | Schanin ....................... 323/235 |
| 5,424,618 | A | * | 6/1995 | Bertenshaw et al. ........ 315/324 |
| 5,600,233 | A | * | 2/1997 | Warren et al. ............... 323/237 |
| 5,933,341 | A | * | 8/1999 | Kuriyama et al. ............ 363/98 |
| 6,175,220 | B1 | * | 1/2001 | Billig et al. ................. 323/239 |
| 6,347,028 | B1 | * | 2/2002 | Hausman et al. .......... 361/93.1 |
| 6,969,959 | B2 | * | 11/2005 | Black et al. ................. 315/307 |
| 7,005,762 | B2 | * | 2/2006 | Black et al. ................. 307/139 |
| 2001/0014949 | A1 | * | 8/2001 | Leblanc ....................... 713/300 |

* cited by examiner

Primary Examiner—Brian Sircus
Assistant Examiner—Danny Nguyen
(74) Attorney, Agent, or Firm—Paul J. Sutton

(57) ABSTRACT

In one embodiment of the invention, a reverse phase control power switching circuit for controlling the flow of current through a load from an AC source comprises a sensing bridge in series with the load and the AC source. The conductive state of the sensing bridge is responsive to a pulse generator and a zero crossing detection and overload protection means. Phase control means coupled to the pulse generator determines turn off of the sensing bridge is reset by the zero crossing detection and overload protection means. Responsive to a load current condition exceeding a maximum current caused by an overload or a short, the zero crossing detection and overloading protection network terminates conduction of current through the sensing bridge. The sensing bridge starts conducting current to the load at the beginning of the AC cycle and continues to conduct to a desired AC voltage phase angle or earlier if an excessive current condition caused by an overload condition or a short occurs.

9 Claims, 2 Drawing Sheets

REVERSE PHASE CONTROL POWER SWITCHING CIRCUIT WITH OVERLOAD PROTECTION

BACKGROUND OF THE INVENTION

1. Field of the Invention

The present invention relates generally to power switching circuits and, more particularly, to a new improved reverse phase control power switching circuit.

2. Description of the Related Art

It is known to control the phase of the voltage and/or current applied to a load from an Alternating Current source by means of an electronic switch that is switched to its conductive state at a time subsequent the zero crossing of the AC periodic waveform, and to then assume an off or blocking state at the next occurring zero crossing of the waveform when the current through the load decays to zero. A disadvantage with this type of phase control circuit is that the load is subjected to a sudden and abrupt increase in voltage/current when the switching device is turned on. This sudden and abrupt increase in voltage/current to the load can be objectionable. For example, where the load is an incandescent lamp, this surge in current through the lamp filament can create a large magnetic field which can cause the filament and its support to change their lengths to cause what is known as incandescent hum. Clearly, when the incandescent lamp is located in a very low ambient sound environment, the audible sound that is produced can be objectionable.

As noted in the prior art, circuits have been developed which use a current choke such as a large inductor to limit the current rise to an acceptable level to minimize the effects of the abrupt increase in current and voltage over a short period of time. The inductor is normally placed in series with the load to limit the rate of change of current passing through the load to reduce the lamp hum. A disadvantage with this method is that the inductor carries the full load current which causes a reduction in power applied to the load. The voltage drop across the inductor can be as large as several volts. In addition, the inductors can be relatively expensive, undesirably large and may produce objectionable audible hum from their cores.

Power control systems are subject to a variety of conditions since a variety of power sources and loads can be coupled through the switches. Power control switching circuits are subject to damage or performance impairment by a variety of device threatening conditions. These include excessive currents, voltages and temperatures. Accordingly, power control systems using voltage controlled switches include protective circuits that handle these conditions. In some cases these circuits shut down operation until the condition is removed. An example of a device threatening condition is an excessive current, an over current that is caused, for example, by a short circuit or a large load. Such an excessive current can destroy the power switching circuit. Therefore, some over current protection, generally a current limiter, is provided in a power control system. Various circuits and method directed toward addressing these problems have been disclosed in U.S. Pat. Nos. 4,528,494 ('494); 5,004,969 ('969); and, 5,239,255 ('255). U.S. Pat. Nos. '494 and '255 are directed toward protecting reverse phase control power switching circuits from an over current which occurs when an incandescent lamp goes from a non-incandescent state to an incandescent state. Typically, surge currents through a cold filament are over 10 times the steady state requirements when a non-incandescing incandescent lamp is energized. In '494 and '255, the duration of current flow through the load, and the amount of power dissipated therein is gradually increased an the resistance of the cold tungsten filament increases. U.S. Pat. No. '969 discloses a reverse phase control system that can pass current through a load from an AC source without the need for zero-crossing detection of the voltage waveform.

Thus the prior art provides a variety of schemes for addressing device and performance threatening conditions. However, these schemes generally involve undesirable tradeoffs. What is needed is a power control system that provides the necessary protective measures without minimizing performance.

SUMMARY OF THE INVENTION

In one embodiment of the invention, a reverse phase control power switching circuit for controlling the flow of current through a load from an AC source comprises a sensing bridge in series with the load and the AC source. The conductive state of the sensing bridge is responsive to a pulse generator and/or a zero crossing detection and overload protection network. Phase control means coupled to the pulse generator determines turn off of the sensing bridge. Responsive to a load current condition that exceeds a maximum current caused by an overload or a short, the zero crossing detection and overload protection network terminates conduction of current through the sensing bridge.

In the preferred embodiment, the sensing bridge starts conducting at the beginning of the AC cycle to permit current to flow to the load, and turns off at a voltage phase angle which is determined by a manually changeable control in the phase control circuit or by an excessive current condition caused by an overload condition or a short.

The foregoing has outlined, rather broadly, the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWING

Other aspects, features, and advantages of the present invention will become more fully apparent from the following detailed description, the appended claims, and the accompanying drawings in which:

DETAILED DESCRIPTION

Figure 1:
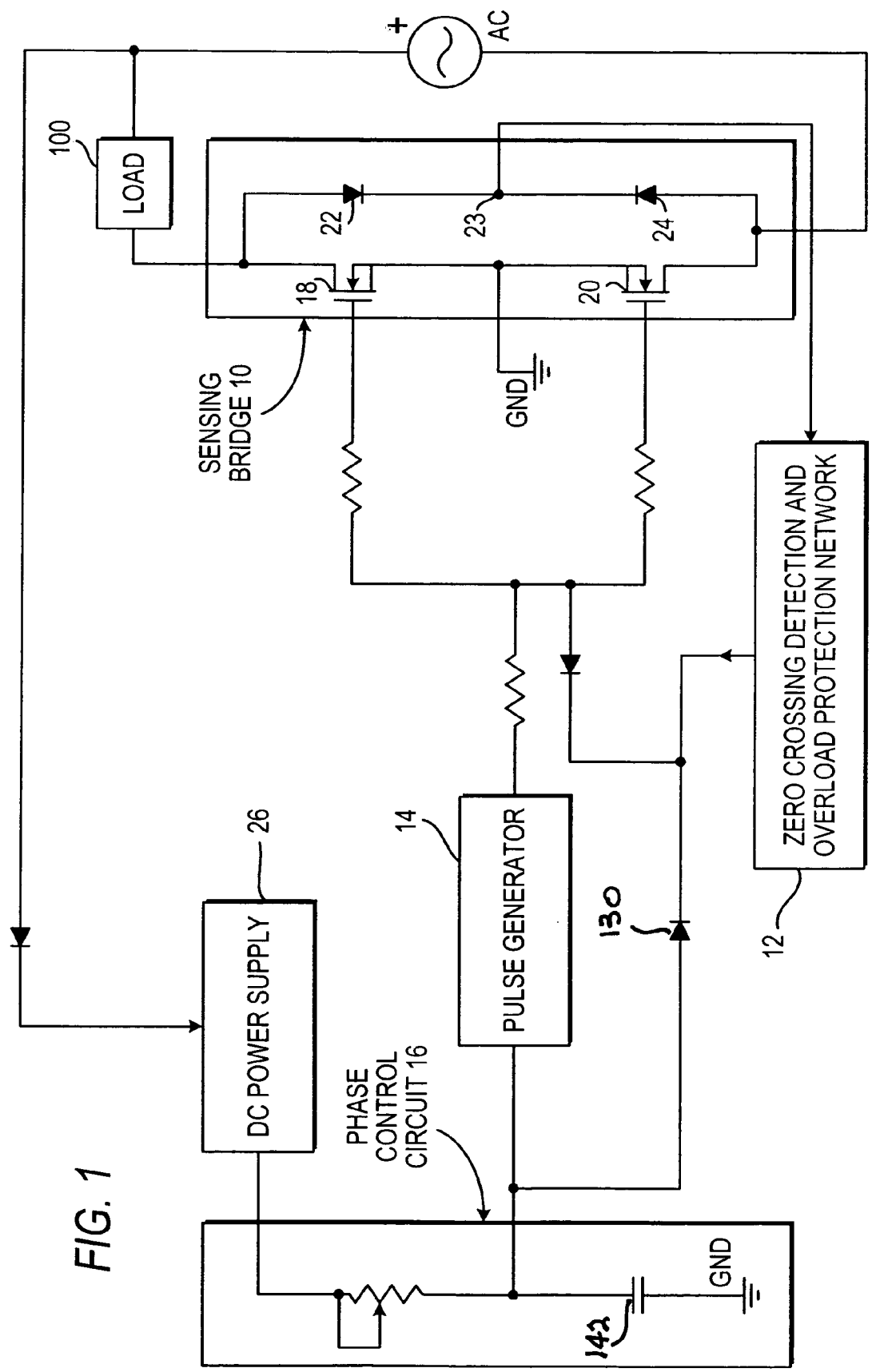
FIG. 1 is a schematic-block diagram of a phase control power switching circuit in accordance with the principles of the invention.

Referring to FIG. 1, there is illustrated a block diagram of a reverse phase control power switching circuit. The disclosed circuit controls the power from an AC source to a load and comprises a sensing bridge 10, a zero crossing detector and overload protection network 12, a pulse gen erator 14, a phase control circuit 16 and a DC power supply 26.

The sensing bridge comprises two MOSFETs 18, 20 in inverse series connection and two opposing diodes 22, 24. The source terminals of the MOSFETs are connected together and to a ground terminal. The drain terminal of MOSFET 18 is connected to the anode terminal of diode 22, and the drain terminal of MOSFET 20 is connected to the anode terminal of diode 24. The cathode terminals of diodes 22, 24 are connected to terminal 23. The voltage on terminal 23 is fed to the input terminal of the zero crossing detection and overload protection device 12. The output of network 12 is coupled through a diode and resistors to the gate terminals of the MOSFETs 18, 20 and is also coupled through a diode to the input terminal of pulse generator 14. The input terminal of pulse generator 14 is also coupled to receive a control signal from the phase control circuit 16. The output of the pulse generator is coupled to the gate terminals of the MOSFETs.

The MOSFETs are used as electronic switches to turn on at the beginning of the AC voltage cycle and turn off at a desired AC voltage phase angle. Referring to FIG. 1, the maximal voltage among the two MOSFETs 18, 20 is detected and rectified by the diodes 22, 24, and this rectified voltage appears at terminal 23. The rectified voltage on terminal 23 is fed to the input terminal of the zero crossing detector and overload protection network 12. The output voltage of the zero crossing detector and overloading protection network is coupled to the gate terminals of the MOSFETs 18, 20. When the input voltage to network 12 rises to a preset value, it is triggered and its output signal goes to zero to turn off MOSFETs 18, 20.

Referring to the operation of the invention, it is assumed that the AC voltage has passed through the zero crossing, the output voltage of the sensing bridge at terminal 23 is zero, and the output of the zero crossing detection and overload protection network is high. When the voltages from the pulse generator 14 and the zero crossing detection and overload protection network 12 are high, the power switches 18, 20 are conducting. The phase control circuit 16 is a resistor-capacitor (RC) circuit fed by a DC power supply 26. The RC circuit is a timing circuit where the voltage across the capacitor increases at a rate that is dependent of the value of the resistor. The larger the value of the resistor, the longer it takes the capacitor to reach a set voltage. Thus, as the value of the resistor is increased, the time required for the voltage across the capacitor to reach a specific value is also increased. The voltage across the capacitor is fed to the pulse generator 14. When the pulse generator receives a voltage from the phase control circuit that is of a preset level, the output voltage of the pulse generator 14 goes to zero and turns off the MOSFETs 18, 20. At this instant the voltage on terminal 23 goes to zero to cause the output voltage of the zero crossing detection and overload protection network to go to zero. This, in turn, causes the capacitor 142 of the phase control circuit 16 is to discharge through the diode 130. Discharging the capacitor 142 to zero causes the output voltage of pulse generator 14 to be switched to high which conditions the MOSFETs 18, 20 to turn on at the next occurring zero crossing time.

As noted above, the sensing bridge can detect the maximal voltage among the MOSFETs 18, 20. When either MOSFET 18 or 20 becomes overheated, the body impedance of the overheated MOSFET goes high. This high body temperature causes the voltage of that MOSFET to go high. If the overheated MOSFET causes the voltage at junction 23 to increase to a value that is higher than the preset voltage, the voltage at the output of the zero crossing detection and overload protection network will go to zero and the MOSFETs 18, 20 will be protected from being overheated by being shut down. In a similar manner, when the output is shorted, the MOSFETs will be shut down.

Figure 2:
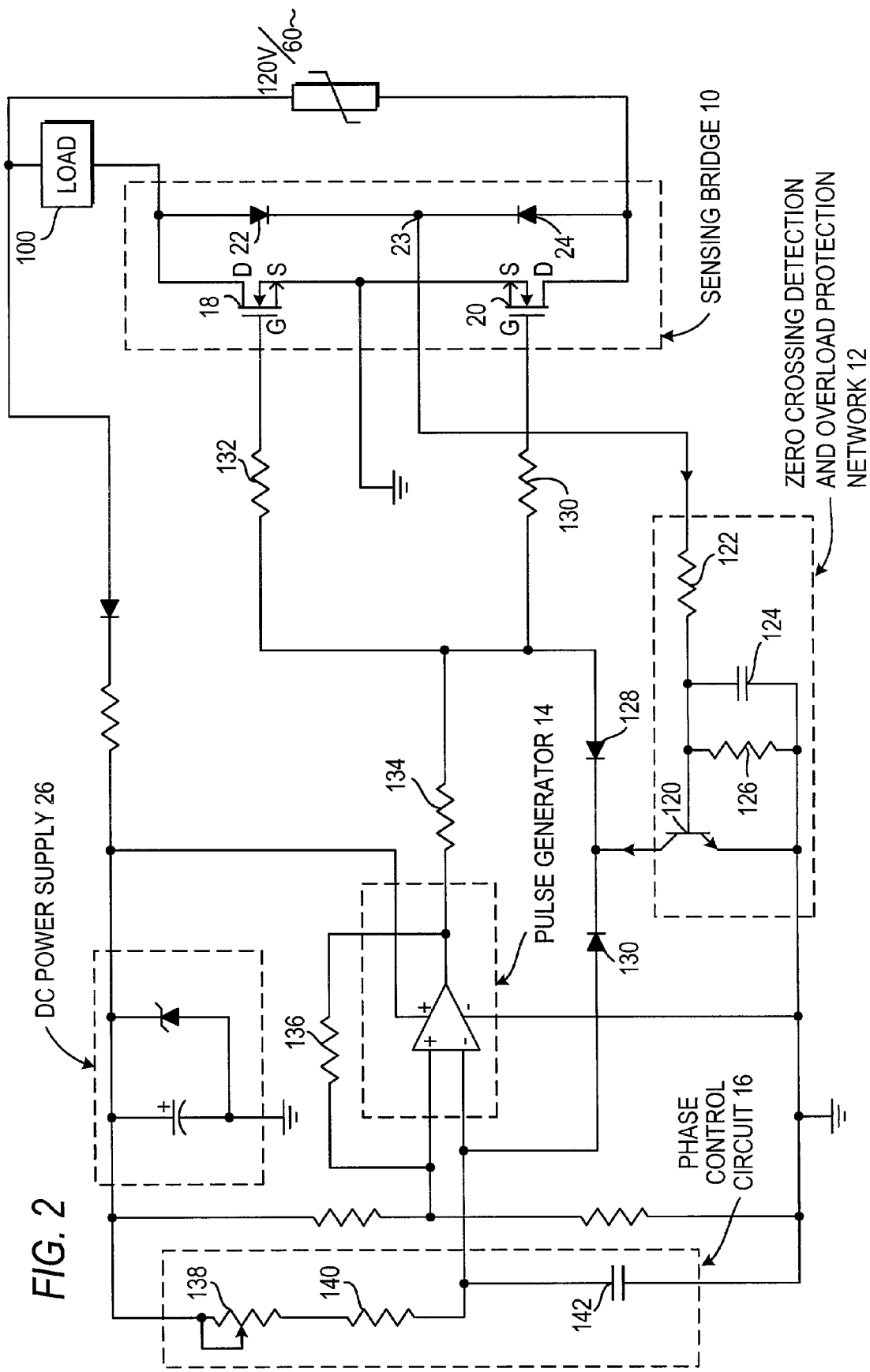
FIG. 2 is a schematic diagram of a phase control power switching circuit in accordance with the principles of the invention.

Referring to FIG. 2, zero crossing detection and overload protection network 12 contains an input resistor 122 interposed between terminal 23 of the sending bridge and the base terminal of transistor 120. Resistor 126 and capacitor 124 are connected between gate and the base terminal of transistor 120. The emitter of the transistor is connected to ground and the collector is connected to the output terminal of the zero crossing detection and overload protection network 12. The output terminal of network 12 is connected through diode 128 to resistors 130, 132 which are connected to the ground terminals of MOSFETs 18, 20. The output terminal of network 12 is also connected through diode 130 to the input terminal of the pulse generator 14. The output terminal of pulse generator 14 is connected to the ground terminals of the MOSFETs 18, 20 through resistors 130, 132. DC power supply 26 is connected to feed a DC voltage to the phase control circuit 16 which includes variable resistor 138, fixed resistor 140 and capacitor 142 connected in series. Variable resistor provides the phase angle at which the MOSFETs are turned off by controlling the time required for the capacitor to reach a set voltage. The junction of the resistor 140 and the capacitor 142 is connected to the input terminal of the pulse generator 14.

While there has been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A phase control power switching circuit for controlling the phase angle of current flow through a load from an alternating current source, the circuit comprising:

a pair of voltage control switches in inverse series connection for controlling alternating current flow through the load;

maximal voltage sensing means coupled to the pair of voltage control switches to sense a maximal voltage between the pair of voltage control switches;

a zero crossing detection and overload protection network coupled to said maximal voltage sensing means and having the maximal voltage as an input;

control means having a phase control means for selectively adjusting the phase angle to drive the pair of voltage control switches to an off condition; and pulse generator means adapted to generate a first voltage of a first value and a second voltage of a lower value wherein the second voltage can have a value of zero volts or greater and wherein the pulse generator means is coupled to drive the pair of voltage control switches from their on condition to their off condition, wherein the phase control means is coupled to selectively switch the output of the pulse generator means from the first voltage to the second voltage to drive the voltage control switches to their off condition, the phase control means comprises a resistor in series with a capacitor wherein the voltage across the capacitor is applied to the pulse generator means, and the zero crossing detection and overload protection network is coupled to discharge the capacitor after the pulse generator drives the voltage control switches to their off condition.

2. The phase control power switching circuit of claim 1 wherein the maximal voltage sensing means comprises first and second series connected diodes coupled in parallel to the pair of voltage control switches wherein the maximal voltage between the pair of voltage control switches is sensed between the first diode and the second diode.

3. The phase control power switching circuit of claim 2 wherein the control means is adapted to assume a first state when the maximal voltage sensed is less than a set voltage and a second state when the maximal voltage sensed is greater than the set voltage, wherein the pair of control switches are switched from their on condition to their off condition in accordance with the control means being in its second state.

4. The phase control power switching circuit of claim 3 wherein the control means assumes its second state and causes switching of the pair of voltage control switches to their off condition when an overheated voltage control switch causes the maximal voltage sensed to be greater than the set voltage.

5. The phase control power switching circuit of claim 1 wherein the voltage control switches are adapted to be driven to their off condition by the second voltage from the pulse generator.

6. The phase control power switching circuit of claim 1 wherein the time required to charge the capacitor to a set voltage is controllable.

7. The phase control power switching circuit of claim 1 wherein the phase control means is coupled to switch the output of the pulse generator to the first voltage when the capacitor is discharged to condition the pair of voltage control switches to assume their on condition at the next occurring zero crossing time of the AC voltage waveform.

8. The phase control power switching circuit of claim 1 wherein the pair of voltage control switches are MOSFETs.

9. The phase control power switching circuit of claim 1 wherein the pair of voltage control switches are IGBTs.

* * * * *